United States Patent
Albright

[15] 3,653,769
[45] Apr. 4, 1972

[54] STADIAMETRIC RANGING SYSTEM

[72] Inventor: John D. Albright, Beltsville, Md.

[73] Assignee: The United States of America as represented by the Secretary of the Navy

[22] Filed: Mar. 6, 1970

[21] Appl. No.: 17,272

[52] U.S. Cl. ............................356/141, 356/1, 343/112 R, 235/150.271
[51] Int. Cl. ..........................................G01b 11/26
[58] Field of Search .............356/1, 141; 343/112 C, 112 D; 235/150.271, 150.272

[56] References Cited

UNITED STATES PATENTS

| 2,681,764 | 6/1954 | Gale | 235/150.272 |
| 3,244,810 | 4/1966 | Williams | 178/DIG. 21 |
| 2,763,856 | 9/1956 | Lattmann | 343/15 |

Primary Examiner—Benjamin A. Borchelt
Assistant Examiner—S. C. Buczinski
Attorney—R. S. Sciascia and A. W. Collins

[57] ABSTRACT

Subject disclosure relates to a novel and improved system for determining the range and aspect of an aircraft or any other vehicle moving in three dimensions in relation to a fixed point. The system includes a fixed isoceles right triangular pattern laid out on the ground or an another suitable reference plane, an energy sensor detector on the aircraft that develops an image of triangular pattern, and determines the coordinates of the apices of the pattern, a computer on the aircraft that performs predetermined mathematical operations on the apex coordinate data from the sensor detector and a readout device on the aircraft that continuously provides range and aspect data that defines the position of the aircraft.

2 Claims, 3 Drawing Figures

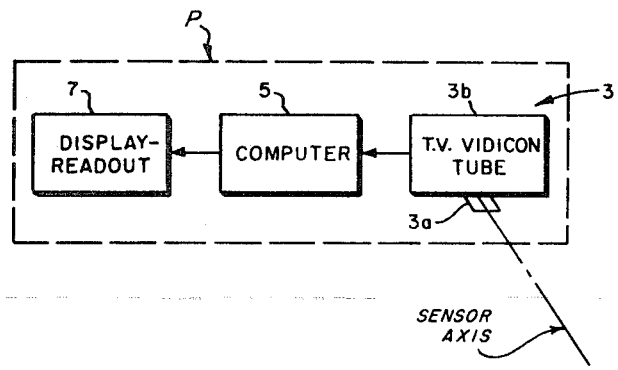
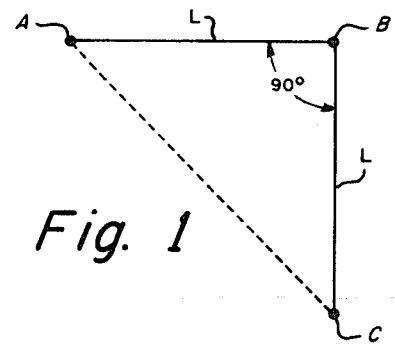
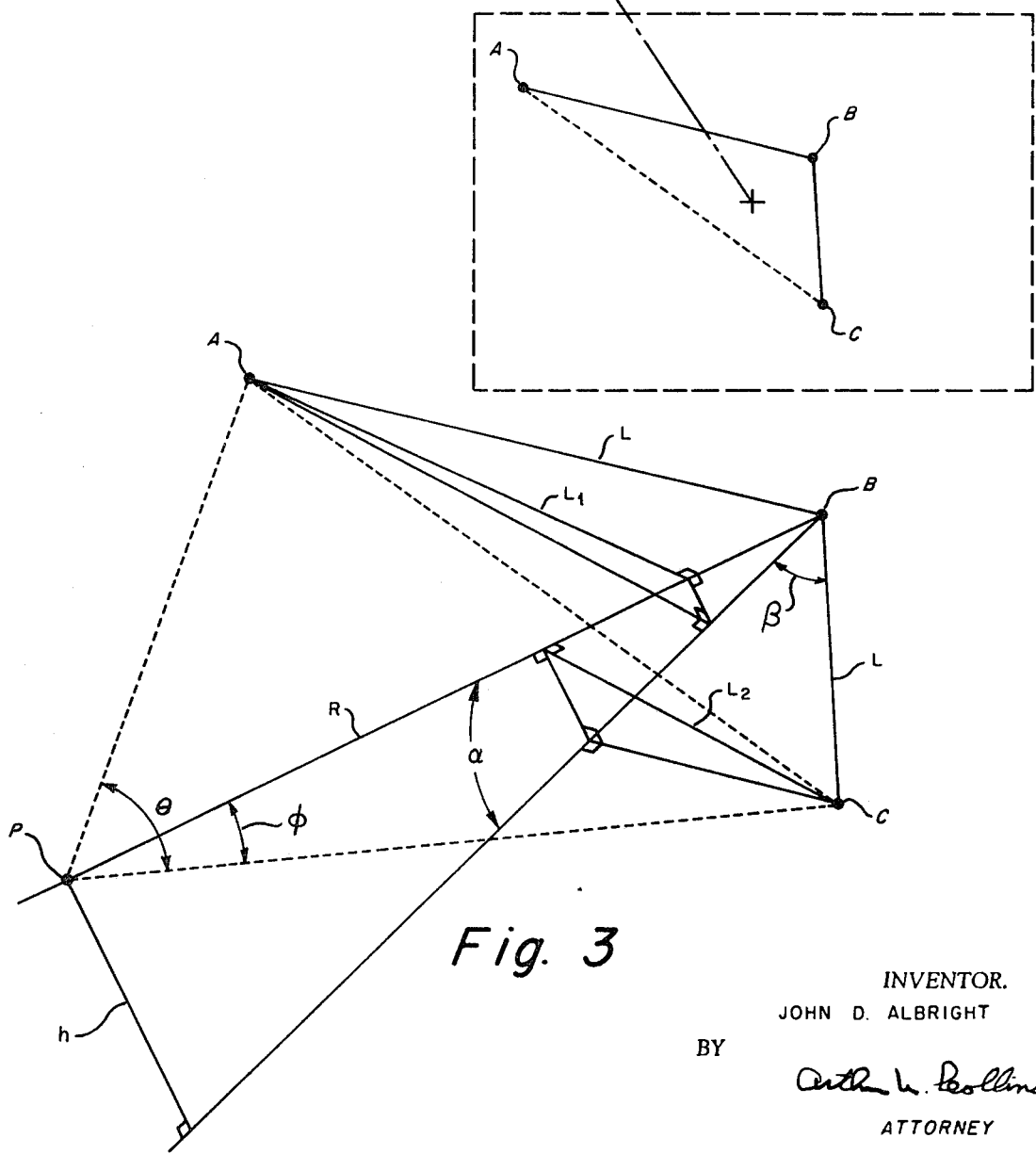
Fig. 1
Fig. 2
Fig. 3
INVENTOR.
JOHN D. ALBRIGHT
BY
Arthur M. Collins
ATTORNEY

STADIAMETRIC RANGING SYSTEM

When an aircraft makes an approach to a point on the ground or another reference surface either for an attack or a landing, information in some form which tells the pilot precisely where he is with respect to the point is often necessary. Large airports often provide extensive runaway lighting systems and various intricate non-visual electronic devices to assist landing and other operations at night and at other times where visibility is restricted. Situations, however, also occur when it is desirable to make a precise approach at an airport where extensive landing aids are not available or economically feasible.

It is therefore a principal object of the invention to provide a novel and improved system which continuously and accurately defines the position of an aircraft or other moving vehicle with respect to a fixed point.

It is a further object of the invention to provide a novel and improved system which accurately defines the position of an aircraft with apparatus and circuitry which are relatively simple compared to presently used electronic and radar type devices.

It is a further object of the invention to provide a novel and improved system that accurately defines the position of an aircraft during a landing operation on an aircraft carrier.

It is a further object of the invention to provide a novel and improved system that assists the pilot of an aircraft to set a precise offset course with respect to a known fixed reference point.

Other objects and many of the attendant advantages of this invention will be readily appreciated as the same becomes better understood by reference to the following detailed description when considered in connection with the accompanying drawing wherein:

FIG. 1 is a plan view of a preferred triangular pattern of energy projecting devices laid out on the ground or other reference surface in accordance with the present invention;

FIG. 2 is a diagrammatic view of the apparatus of the present invention positioned on the aircraft and its relation to the fixed triangular pattern on the reference surface;

FIG. 3 is a perspective view of the geometric relations of the aircraft and the triangular pattern on the reference surface.

Referring now to the various figures of the drawing, it will be noted that three light energy sources A, B and C are laid out on the ground in the pattern of an isosceles right triangle. The legs AB and BC of the triangular pattern are of any suitable equal length and the right angle of the triangle is located at the source B. The projected view of the triangular pattern of the three light sources appears from the aircraft P as in FIG. 2 of the drawing. The aircraft P carries the energy sensor detector 3, which is mounted in any suitable conventional manner preferably on an axis parallel to the longitudinal axis of the aircraft, the computer 5 which is coupled to the output of the sensor detector 3, and the display readout device 7 which is coupled to the output of the computer.

The structural details of the sensor detector 3, the computer 5 and the readout device 7 may take any of a number of specific conventional mechanical and/or electrical forms. Since the details of their construction form no part of the invention, the same are not included herein for the sake of simplicity. For a full understanding of the invention, it need only be understood that the energy sensor detector 3 preferably includes a telescope 3a and a television vidicon tube 3b having a sensing area of approximately ¾ inch square. The telescope-vidicon tube assembly is gimbal mounted in a protective housing on the aircraft preferably under the fuselage of the aircraft or in a pod under a wing. The computer 5 is preferably a digital logic package of integrated solid state circuitry such as a UNIVAC 1108. It must be fast enough to compute new output parameters for each frame of the vidicon TV raster. Using various general geometric relations of the triangular pattern of the three light energy sources A, B and C on the ground as it is projected up to the aircraft P, the computer 5 is programmed to accept data read from the projected pattern by the sensor detector 3 and determine the range from the aircraft to ground at point B along the sight line PB of the telescope of the sensor detector, the altitude of the aircraft above the ground, the down look angle of the telescope with respect to the horizon, and the azimuth angle of the movement of the aircraft with respect to the coordinates of the ground pattern.

More specifically, it can be shown that in FIG. 3 of the drawing $$\alpha = \arcsin \sqrt{\frac{K^2 \tan^2 \beta}{1 - K^2 \tan^2 \beta}} \quad (1)$$

and that $$\theta = \arctan \left[ \frac{\frac{\sin \alpha}{\tan \beta} + \sin \alpha \tan \beta}{-\cos^2 \alpha} \right] \quad (2)$$

where $\alpha$ is the down look angle of the telescope on the aircraft to the point B, $K$ is the ratio $L_2/L_1$ ($L_1$ and $L_2$ being the projected lengths of triangle legs AB and BC to the down look sight line PB), $\beta$ is the azimuth angle on the ground between the sight line projection and the foreshortened leg BC of the triangle, and $\theta$ is an angle between the extremities of the projected legs of the triangular pattern.

The coordinates of points A, B and C which are continuously furnished to the computer 5 by the sensor-detector 3 are used to determine $\theta$ and 0, the projected lengths $L_1$ and $L_2$ and the ratio K directly. Equations (1) and (2) therefore involve two known quantities ($\theta$ and K) and two unknowns ($\alpha$ and $\beta$). A simultaneous solution of equations (1) and (2) in the computer 5 produces the values of $\alpha$ and $\beta$.

It can also be shown that the range of the aircraft P to ground point B along the down look sight axis PB in FIG. 3 of the drawing is given by the equation:

$$R = L \left[ \cos \alpha \cos \beta + \sqrt{\frac{1 - \cos^2 \alpha \cos^2 \beta}{\tan \phi}} \right] \quad (3)$$

where $R$ is range PB to ground point B, $L$ is the true length of triangle legs AB and BC, and 0 is the angle subtended by the projection of the foreshortened leg BC of the triangle.

It can also be shown that:

$$h = R \sin \alpha \quad (4)$$

where $h$ is the altitude of the aircraft above the ground.

Thus, it is seen that knowing the true dimensions of the ground light pattern and the coordinates of each of the light sources A, B and C, the computer 5 can be programmed in a suitable conventional manner to provide the range, altitude, azimuth and other positional data of the aircraft at all times.

In operation, when the telescope of the sensor detector 3 is directed toward the preset triangular pattern of light energy sources A, B and C on the ground, the telescope projects an image in the visible light frequency range on the vidicon tube surface. The tube surface is then scanned in a TV type raster operation and the positions of the light sources of the pattern on the light sensitive surface are detected. The video output pulses of the vidicon on the raster then determine the coordinates of the projected pattern points A, B and C with respect to the optical axis of the telescope-vidicon tube assembly. The coordinate pulses of points A, B and C are then fed to the computer 5 which performs the computations indicated and outlined in detail hereinabove. The readout device 7 coupled to the output of the computer 5 continuously displays the range and aspect data with respect to the triangular pattern on the ground.

It is to be understood that, although the markers which define the apices of the triangular ground pattern are disclosed herein as being active light energy sources, any other suitable active energy radiator or passive energy reflector could be used without departing from the spirit or scope of the invention.

Similarly, it is to be understood that any triangular or geometric ground pattern other than the isosceles right triangular pattern disclosed herein could be used without departing from the spirit or scope of the invention by suitable adjustment of the preset mathematic operations in the computer.

It is also to be understood that, although the sensor-detector described herein operates in the visible light frequency region, any suitable part of the electromagnetic spectrum could be used without departing from the spirit or scope of the invention.

Obviously, many modifications and variations of the present invention are possible in the light of the above teachings. It is therefore to be understood that within the scope of the appended claims, the invention may be practiced otherwise than as specifically described.

What is claimed is:

1. Apparatus for determining the position of an aircraft in relation to the ground, said apparatus comprising:
   a. three light energy sources positioned on the ground in an isosceles right triangular pattern;
   b. an energy sensor detector positioned on the aircraft which develops an image of the triangular pattern and determines various parameters of the pattern image, said detector including a telescope device mounted on an axis parallel to the longitudinal axis of the aircraft and a television vidicon tube;
   c. and a computer on the aircraft which is coupled to detector and which performs predetermined mathematical operations including the solution of the following equations for $\alpha$ and $\beta$:

$$\alpha = \arc\sin \sqrt{\frac{K^2 - \tan^2 \beta}{1 - K^2 \tan^2 \beta}} \quad (1)$$

$$\theta = \arc\tan \left[ \frac{\frac{\sin \alpha}{\tan \beta} + \sin \alpha \tan \beta}{-\cos^2 \alpha} \right] \quad (2)$$

where $\alpha$ is the down look angle of the telescope device on the aircraft to the apex of the right angle of the ground triangular pattern, $K$ is the ratio $L_2/L_1$ ($L_1$ and $L_2$ being the projected lengths of the legs of the triangular pattern to the extended axis of the telescope device), $\beta$ is the azimuth angle on the ground between projection on the ground of the extended axis of the telescope device and a foreshortened leg of the triangular pattern, and $\theta$ is the angle between the extremities of the projected legs of the triangular pattern.

2. The apparatus substantially as described in claim 1 wherein the mathematical operations of the computer further include solution of the following equation:

$$R = L \left[ \cos \alpha \cos \beta + \sqrt{\frac{1 - \cos^2 \alpha \cos^2 \beta}{\tan \phi}} \right]$$

where $R$ is the range of the aircraft to the apex of the right angle of the triangular pattern, $L$ is the ground length of the legs of the triangular pattern, and $\theta$ is the angle between the extremities of the projected said foreshortened leg of the triangular pattern.

* * * * *